US011887779B2

(12) United States Patent
Lown

(10) Patent No.: US 11,887,779 B2
(45) Date of Patent: Jan. 30, 2024

(54) MAGNET ARRANGEMENT FOR PRODUCING A FIELD SUITABLE FOR NMR IN A CONCAVE REGION

(71) Applicant: Livivos Inc., San Diego, CA (US)

(72) Inventor: Robert R. Lown, San Diego, CA (US)

(73) Assignee: Livivos Inc., San Diego, CA (US)

( * ) Notice: Subject to any disclaimer, the term of this patent is extended or adjusted under 35 U.S.C. 154(b) by 0 days.

(21) Appl. No.: 18/112,280

(22) Filed: Feb. 21, 2023

(65) Prior Publication Data

US 2023/0360832 A1 Nov. 9, 2023

Related U.S. Application Data

(63) Continuation of application No. 17/228,409, filed on Apr. 12, 2021, now Pat. No. 11,587,707, which is a continuation of application No. 16/677,562, filed on Nov. 7, 2019, now Pat. No. 10,978,230.

(60) Provisional application No. 62/756,689, filed on Nov. 7, 2018.

(51) Int. Cl.
*H01F 7/02* (2006.01)

(52) U.S. Cl.
CPC ........... *H01F 7/0278* (2013.01); *H01F 7/021* (2013.01)

(58) Field of Classification Search
CPC ............................... H01F 7/0278; H01F 7/021
See application file for complete search history.

(56) References Cited

U.S. PATENT DOCUMENTS 2,698,917 A * 1/1955 Rademakers .......... H04R 9/025 335/302
4,536,230 A * 8/1985 Landa ..................... H01F 7/021 148/300
5,034,715 A * 7/1991 Leupold ................ H01F 7/0278 335/306
2005/0258924 A1* 11/2005 Xia ....................... H01F 7/0278 335/296

FOREIGN PATENT DOCUMENTS

GB 1528151 A * 10/1978 ........... H01F 7/0278
WO WO-2020041523 A1 * 2/2020 ......... G01R 33/3808

* cited by examiner

*Primary Examiner* — Mohamad A Musleh
(74) *Attorney, Agent, or Firm* — Sheppard Mullin Richter & Hampton LLP

(57) ABSTRACT

A magnet system for use in a nuclear magnetic resonance ("NMR") apparatus includes a first magnet and a second magnet located on a backplane to form a gap therebetween, wherein the first magnet and the second magnet are each shaped to form trapezoidal prisms with dimensions selected to optimize a magnetic field at a target region in space external to the magnet system.

14 Claims, 12 Drawing Sheets

MAGNET ARRANGEMENT FOR PRODUCING A FIELD SUITABLE FOR NMR IN A CONCAVE REGION

CROSS-REFERENCE TO RELATED APPLICATIONS

This application is a continuation of U.S. patent application Ser. No. 17/228,409, filed Apr. 12, 2021, now U.S. Pat. No. 11,587,707, which is a continuation of U.S. patent application Ser. No. 16/677,562, filed Nov. 7, 2019, now U.S. Pat. No. 10,978,230, which claims the benefit of and priority to U.S. Provisional Application Ser. No. 62/756,689 filed Nov. 7, 2018, the contents of which are incorporated herein by reference in their entirety.

FIELD

The disclosed technology relates generally to nuclear magnetic resonance ("NMR") and magnetic resonance imaging ("MRI") devices, and more specifically to magnet systems for low-field NMR.

BACKGROUND

NMR and MM are techniques used to measure, detect, survey, and/or understand patient health by imaging, detecting, and/or monitoring conditions and/or materials present internal to a biological subject, i.e., a human or animal patient. Generally, NMR and MM devices must generate high magnetic field strengths (in the order of 1.5 Tesla or greater) in order to reliably provide health data to a physician.

The liver is the largest organ inside the human body. It helps the body digest food and prevents harmful toxins from entering the blood. Diseases affecting the liver include hepatitis, cancer, hemochromatosis, and diseases caused by poisons and substance abuse. Fatty liver disease, or hepatic steatosis, occurs when excess fat builds up in the liver. This excess fat can cause liver inflammation, scarring, and in severe cases liver failure. Cirrhosis is an extreme form of liver scarring. Elevated iron levels can be present in patients with hemochromatosis as well as fatty liver disease and hepatitis C. Doctors employ various imaging tests to check for excess fat, iron, and other liver problems. These include ultrasound, CT scan, and MRI scan. Of these three methods, MRI is the most reliable way to detect the fat and iron content of the liver because it provides the most detailed images of soft tissue. Unfortunately, MRI scans can be difficult to perform and are expensive relative to other techniques. The subject must lie still inside a narrow tube formed by the magnet performing the measurement. This experience can be especially uncomfortable for those with claustrophobia. Additionally, the MM machine is very loud and it can sometimes take longer than an hour to complete measurement.

Studies into performing analysis using low field-strength NMR have been unreliable due to difficulties in producing a uniform magnetic field, among other problems. For example, certain features of the magnetic field have impacts on the quality of the measured data and may determine the types of information that can be determined in the NMR or MRI measurement. The magnetic field strength and the magnetic field uniformity are two such features. Another is the size of the region of interest over which the field should meet a minimum uniformity level. External NMR and MM devices also generally employ magnet designs that are large, heavy, of significant size, weight, and cost.

It is particularly challenging to design a magnet for use in making measurements from volumes of interest in the interiors of much larger objects. One example of such a challenge is to acquire NMR or MRI information from the brain, liver or other internal organ of a living human subject. The magnet typically used to acquire such information is large enough to surround the entire torso of the human subject.

One option for providing an external low-field strength magnetic field in an NMR is to use a unilateral magnet design. A common feature of the existing unilateral magnet designs is that they seek to create a region of relatively homogeneous field external to the surface of the magnet arrangement, i.e. on one side of the magnet and not surrounded by at least one magnet. The designs also may include secondary magnets to improve the projection of the volume of investigation farther into the large object. The secondary magnets may serve to improve the uniformity in the volume of investigation, or they may allow the magnet to produce a field of sufficient uniformity over a larger volume. Unilateral magnet designs may produce fields without regions of uniform field, for example, in applications where a field with a constant field variation with respect to distance from the magnet may be of use. The magnets may be designed to produce as strong a field as may be practical at a location as far as possible from the magnet.

BRIEF SUMMARY

According to various embodiments of the disclosed technology, a magnet system for use in an external NMR may partially surround an target region within an object of measurement. For example, the object of measurement may be a portion of a subject's body, wherein the subject may be a human or animal patient. The internal region may be an internal organ, such as the liver, kidneys, lungs, etc. The magnet system may have a concave top surface. The concave top surface may accommodate a large object for measurement and may allow the magnet or magnets in the system to partially surround the large object. The concave design may allow the object of measurement to lie deeper within the magnet system than would be possible with a magnet system having a flat top surface. The magnet system may be designed to generate a larger volume of magnetic field having properties suitable for NMR. These properties may include a more homogeneous magnetic field projected within the target region, low field strength, relatively low weight and size, and/or other advantages over the types of magnet systems used for NMR and MRI systems.

In an example embodiment of the disclosed technology, a concave-shaped magnet system or kit may be designed to generate a magnetic field of low strength and high homogeneity that is sensitive and selective for detection of critical relative materials in the organs of a subject. The NMR, with the disclosed magnets, may be configured to detect and measure the relative and/or absolute presence of various materials within the subject's body and/or internal organs, such as fat content or iron content using principles of NMR and/or MRI. The magnet system may be designed to detect and measure relative and/or absolute quantities of target materials within other internal organs, including the brain, lungs, heart, lymph nodes, blood, etc. The magnet system may be configured in NMR or MM systems for the detection and measurement of other molecules, elements, compounds, or materials based on their interaction with the magnetic fields generated by the magnet system.

In some examples, the magnet system or kit may include two or more permanent magnets. The permanent magnets may have angled, tapered, slanted, or curved top surfaces. The magnets may be arranged such that the magnet systems or kit has a V-shaped configuration or concave top surface. The magnets may be placed so as to form a gap between them. In some examples, magnets or magnetic material may be located in the gap. The additional magnets or magnetic material may be employed to adjust the strength of the magnetic field at a particular location in a space external to the magnet system. The additional magnets or magnetic material may be employed to improve the uniformity of the magnetic field at a particular location. The magnets or magnetic material may be employed to minimize distortion of the magnetic field at a particular location. The magnets or magnetic material may be employed to alter other features or properties of the magnetic field.

In some embodiments, the magnets of the magnet system may be located to form one or more gaps therebetween. Various NMR or MRI components may be located within the gaps, e.g., radio frequency coils, field gradient coils, field shimming coils, or other components related to the functionality of the NMR and/or magnet system. In some examples, the dimensions of the gap produced between magnets may be adjusted so as to produce a magnetic field with desirable properties. The degree of taper or curvature of the magnets may be adjusted so as to produce a magnetic field with desirable properties. The magnets in the system or kit may have varying degrees of taper or curvature.

In some embodiments, a first magnet may be oriented with its polarization orthogonal to the backplane. A second magnet may be oriented with is polarization orthogonal to the backplane and in the opposite direction of the first magnet. In some examples, a horizontal field may be produced above the magnet system. In other example embodiments, a first magnet may be oriented with its polarization orthogonal to the backplane. A second magnet may be oriented with its polarization orthogonal to the backplane and in the same direction as the first magnet. A vertical field may be produced about the magnet system.

In some embodiments, a kit including permanent magnets may be assembled to perform NMR measurements. The kit may include magnets suited to generating a magnetic field with desirable properties for performing measurements. The kit may also include magnets suited to adjusting, correcting, or homogenizing the magnetic field produced by other magnets in the kit.

In some embodiments, an iron backing plate or backplane may be included in the magnet system or kit. The iron backplane may function as a mirror plane and may increase the effectiveness of the magnets in the system or kit in producing a magnetic field with desirable properties at a particular location. The iron backplane may minimize the magnitude and effect of fringe fields. The backplane may be designed in a U-shaped configuration. For example, the U-shaped configuration may better accommodate the object of measurement in the magnet system or kit.

In some embodiments, passive shimming methods may be used in the magnet system or kit. The passive shimming methods may compensate for manufacturing errors. The passive shimming methods may adjust the magnetization strength, magnetization orientation, magnetization uniformity, finite permeability, and physical size and location of magnets and magnetic material in the system or kit. Passive shimming methods may include adjustment of the location of one or more homogenizing magnet in accordance with measurements of the magnetic field or RF signal. Passive shimming methods may be employed subsequent to assembly of the magnet system or kit and measurement of the magnetic field at a particular location or RF signal. In another embodiment, passive shimming may include the addition or removal of small shim magnets or magnetic material from particular locations based on measurements of the magnetic field or RF signal. The passive shimming tools may be located the gap between magnets in the magnet system or kit. Alternatively, the passive shimming tools may be located on the surface of the magnets in the magnet system or kit. The shimming magnets or magnetic material may be of variable sizes. The size of the shimming magnets or magnetic material may be optimized to produce a magnetic field of desirable strength and sensitivity.

In some embodiments, the magnet system or kit may be optimized to deliver an NMR suitable magnetic field to a target volumetric region in space external to the magnet system or kt. For example, the kit or system may be used to deliver a magnetic field within a liver, or other organ, that is located external to the magnetic system or kit. For example, the field location may be selected so as to be in a region of pure liver in a high percentage of the human population. The components of the kit may be configured so as to produce a low strength, high homogeneity magnetic field that is sensitive and selective for detection of critical relative materials, such as fat and iron, in the liver being measured.

Optimization may refer to generating a field at a value suitable for use in medical NMR techniques. In some examples, the field strength is low, i.e., less than 1 Tesla. Optimization may include homogenizing a magnetic field at a selected target region over a volume of interest. It may refer to minimizing distortion and/or variance of a magnetic field at a target region over a volume of interest.

In an example embodiment of the technology disclosed herein, the magnetic field may be optimized to be sufficiently homogenous in the target field region over a given volume of interest. A sufficiently homogenous field over the volume of interest may mean that the magnetic field strength at any given point within the target region is within about twenty percent of an average applied field strength (Bo) for the target region. In some examples, a homogenous magnetic field at the target region may have a field strength at any given point in the target region that is within one standard deviation of the average field strength (Bo) of the target region. In some embodiments, a homogenous magnetic field within the target region may have magnetic field strengths at any point within the target region that is within ten percent of the average field strength (Bo) in the target region. In some examples, optimizing the magnetic field at the target regions may include calculating magnetic field strengths at the target region as generated by magnets disclosed herein, and varying the dimensions of the magnet to minimize the variance in the magnetic field a the target regions, i.e., using goal seek and/or empirical optimization algorithms as known in the art.

In some embodiments, the average field strength (Bo) may be between about 0 and about 5 Tesla. In some embodiments, the average field strength (Bo) may be less than 1 Tesla.

Other features and aspects of the technology described herein will become apparent from the following detailed description, taken in conjunction with the accompanying drawings, which illustrate, by way of example, the features in accordance with embodiments of the disclosed technology. The summary is not intended to limit the scope of this disclosure.

BRIEF DESCRIPTION OF THE DRAWINGS

The technology described herein, in accordance with one or more various embodiments, is described in detail with reference to the following figures. The drawings are provided for purposes of illustration only and merely depict typical or example embodiments. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the technology to the precise form disclosed. It should be understood that the technology described herein can be practiced with modification and alteration, and that the invention be limited only by the claims and the equivalents thereof.

DETAILED DESCRIPTION

The technology described herein is directed towards a system or kit of magnets suitable for use in an external NMR system. In particular, in accordance with some embodiments, an efficiently designed, system or kit of magnets may be configured to produce a uniform magnetic field within a target region located inside a subject's body or internal organs to enable the NMR system to make in vivo measurements from the subject. Various embodiments provide a magnet system or kit that may enable measurement within large, non-planar bodies, such as a human torso. The system may include a backplane and multiple permanent magnets disposed thereon. In some examples, the magnets may be trapezoidal prism shaped magnets in a concave or V-shaped configuration to accommodate projection of a low-field magnetic field within a subject located adjacent to the system. Additionally, as a result of the concave or V-shaped configuration, the object of measurement may be surrounded by at least one magnet. This may enable generation of a homogenous magnetic field at a target region that is at an optimal distance into the object of measurement (i.e., the subject).

The technology is described herein in terms of example embodiments, environments and applications. Description in terms of these embodiments, environments and applications is provided to allow the various features and embodiments of the disclosed technology to be portrayed in the context of an example scenario. After reading this description, it will become apparent to one of ordinary skill in the art how the technology can be implemented in different and alternative embodiments, environments and applications.

Figure 1:
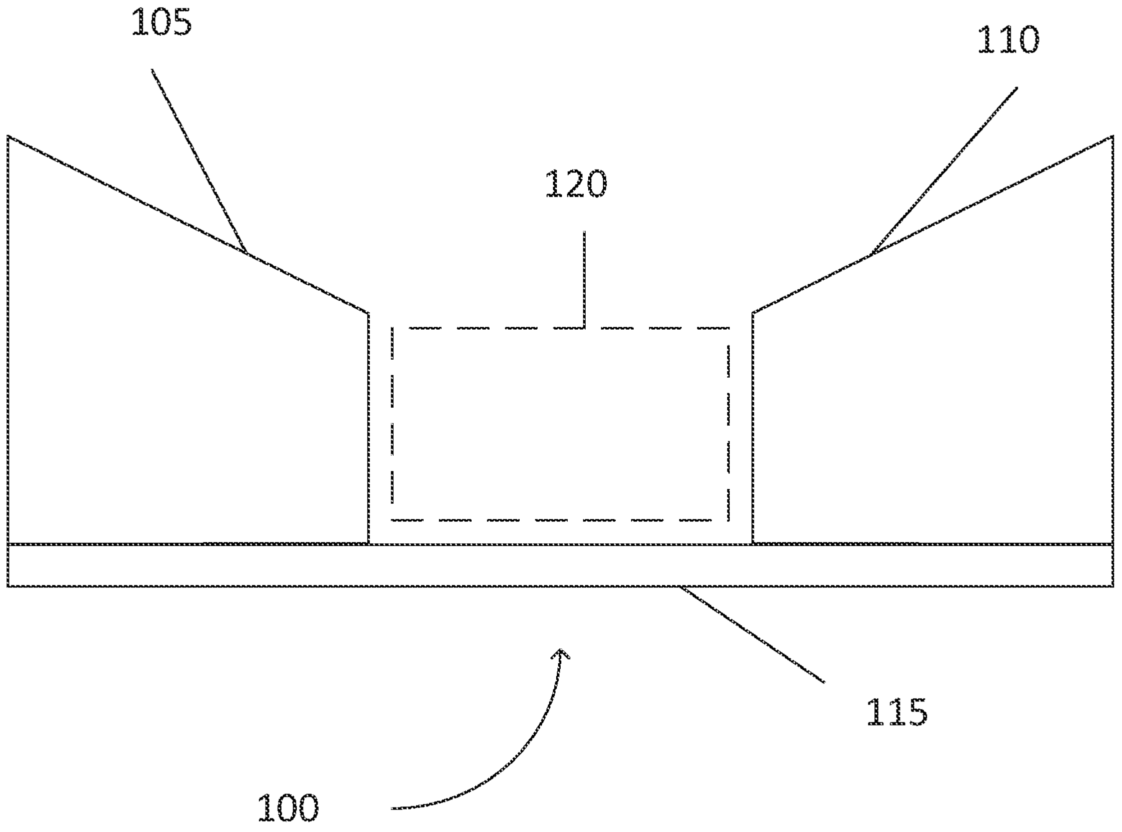
FIG. 1 is a front view diagram illustrating one example of a magnet system and its components in accordance with an embodiment of the technology described herein.

FIG. 1 is a diagram of a front view of an example embodiment of the magnet system. Referring now to FIG. 1, a magnet system 100 may include a first magnet 105, a second magnet 110, and a backplane 115. The first magnet 105 may be located in a first position on the backplane 115. The second magnet 110 may be located in a second position on the backplane 115. A first gap 120 may be produced between the first 105 and second 110 magnets.

Figure 2:
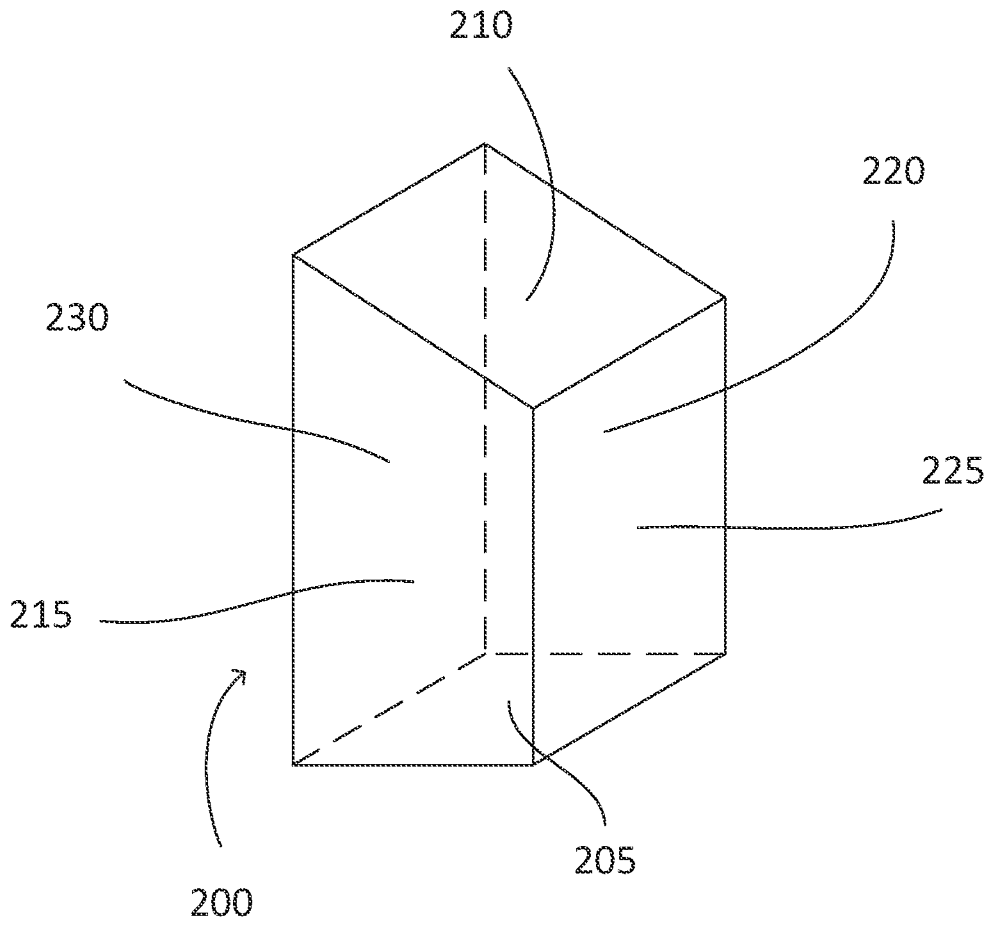
FIG. 2 is a diagram illustrating an example of a magnet shaped to form a trapezoidal prism.

FIG. 2 is a diagram of an example embodiment of a first 105 or second 110 magnet in the magnet system 100. Referring now to FIG. 2, the first 105 or second 110 magnet may be shaped to form a trapezoidal prism 200. The term trapezoidal may encompass traditional linear trapezoids as well as shapes having a near trapezoidal form, including shapes with a curved proximal edge. The trapezoidal prism 200 may have a distal surface 205, a proximal surface 210, a first lateral surface 215, a second lateral surface 220, a third lateral surface 225, and a fourth lateral surface 230. The distal surface 205 may be rectangular. The proximal surface 210 may be rectangular. The first lateral surface 215 may be trapezoidal. The first lateral surface 215 may be right-trapezoidal. The second lateral surface 220 may be trapezoidal. The second lateral surface 225 may be right-trapezoidal. The third lateral surface 225 may be rectangular. The fourth lateral surface 230 may be rectangular. The proximal surface 210 may be opposite the distal surface 205. The first lateral surface 215 may abut proximal 210 and distal 205 surfaces. The second lateral surface 220 may abut the proximal 210 and distal 205 surfaces. The second lateral surface 220 may be opposite the first lateral surface 215. The second lateral surface 220 may be parallel to the first lateral surface 215. The third lateral surface 225 may abut the proximal 210 and distal 205 surfaces. The third lateral surface 225 may be orthogonal to the first 215 and second 220 lateral surfaces. The fourth lateral surface 230 may abut the proximal 210 and distal 205 surfaces. The fourth lateral surface 230 may be opposite to the third lateral surface 225. The fourth lateral surface 230 may be parallel to the third lateral surface 225. The distal 205, proximal 210, first 215, second 220, third 225, and fourth 230 surfaces may conjoin to enclose an interior portion of the first 105 or second 110 magnet.

Figure 3:
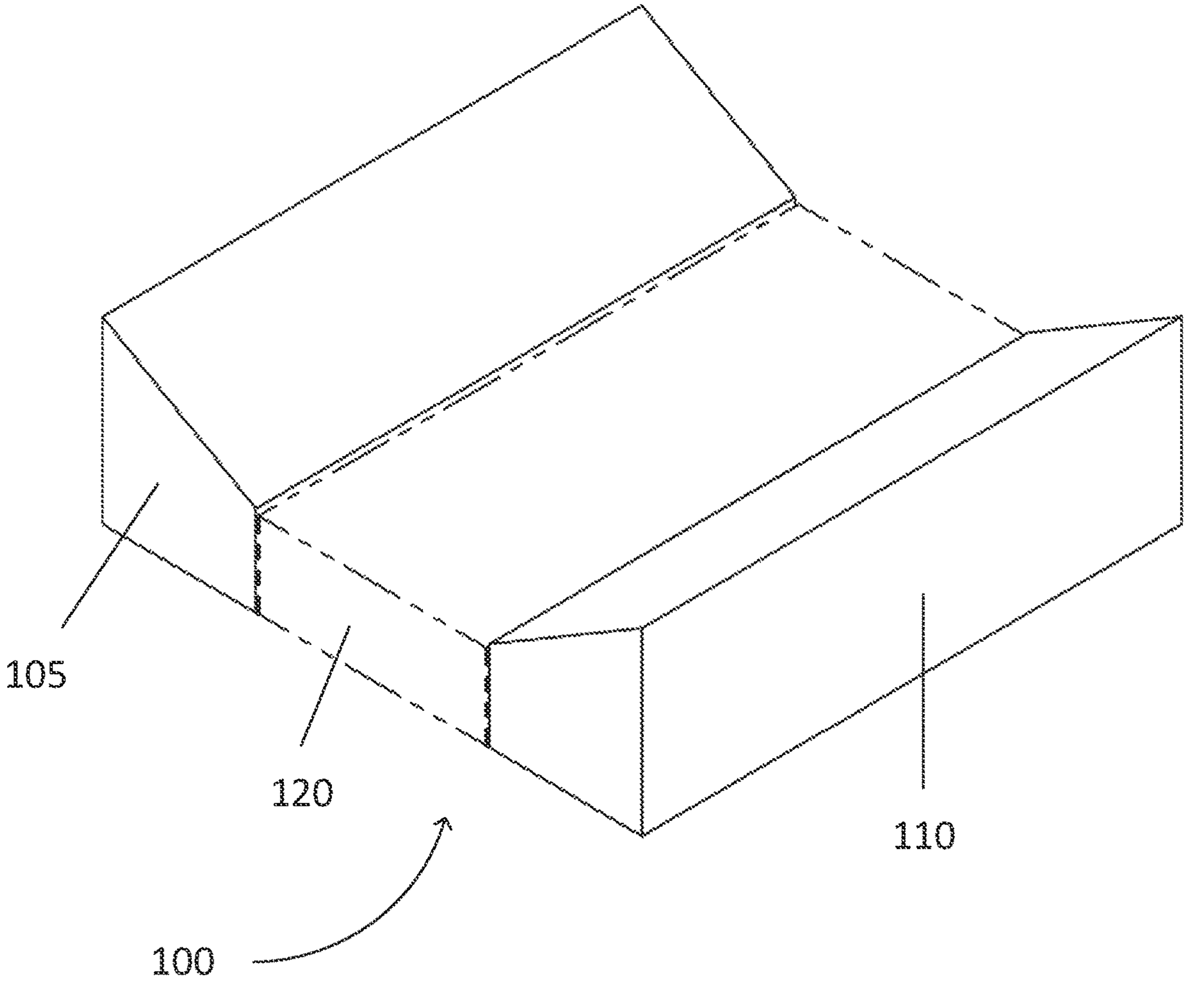
FIG. 3 is an isometric diagram illustrating an example of a magnet system and its components in accordance with an embodiment of the technology described herein.

FIG. 3 is a diagram of an isometric view of an example embodiment of the magnet system. Referring now to FIG. 3, a magnet system 100 may comprise a first magnet 105, a second magnet 110, and a backplane 115. The first magnet 105 may be located in a first position on a top surface of a backplane 115. The second magnet 110 may be located in a second position on a the top surface of the backplane 115. The distal surfaces 205, of the first 105 and second 110 magnets, may abut the top surface of the backplane 115. The third lateral surface 225 of the first magnet 105 may be proximal to the third lateral surface 225 of the second magnet 110. The third lateral surface 225 of the first magnet 105 may be parallel to the third lateral surface 225 of the second magnet 110. A first gap 120 may be formed between the third lateral surface 225 of the first magnet 105 and the third lateral surface 225 of the second magnet 110.

In some embodiments of the magnet system 100, the proximal surface 210 of the first 105 magnet may be angled at an acute angle relative to the distal surface 205 of the first magnet 105. In this embodiment, a height dimension 330 of the fourth lateral surface 230 of the first magnet 105 may be greater than a height dimension 325 of the third lateral surface 225 of the first magnet 105. In some example magnet systems 100, the proximal surface 210 of the second magnet 110 may be angled at an acute angle relative to the distal surface 205 of the second magnet 110. A height dimension 330 of the fourth lateral surface 230 of the second magnet 110 may be greater than a height dimension 325 of the third lateral surface 225 of the second magnet 110. In some example magnet systems 100, the degree at which the proximal surface 210 of the first magnet 105 is angled relative to the distal surface 205 of the first magnet 105 may be different than the degree at which the proximal surface 210 of the second magnet 110 is angled relative to the distal surface 205 of the second magnet 110.

Figure 4:
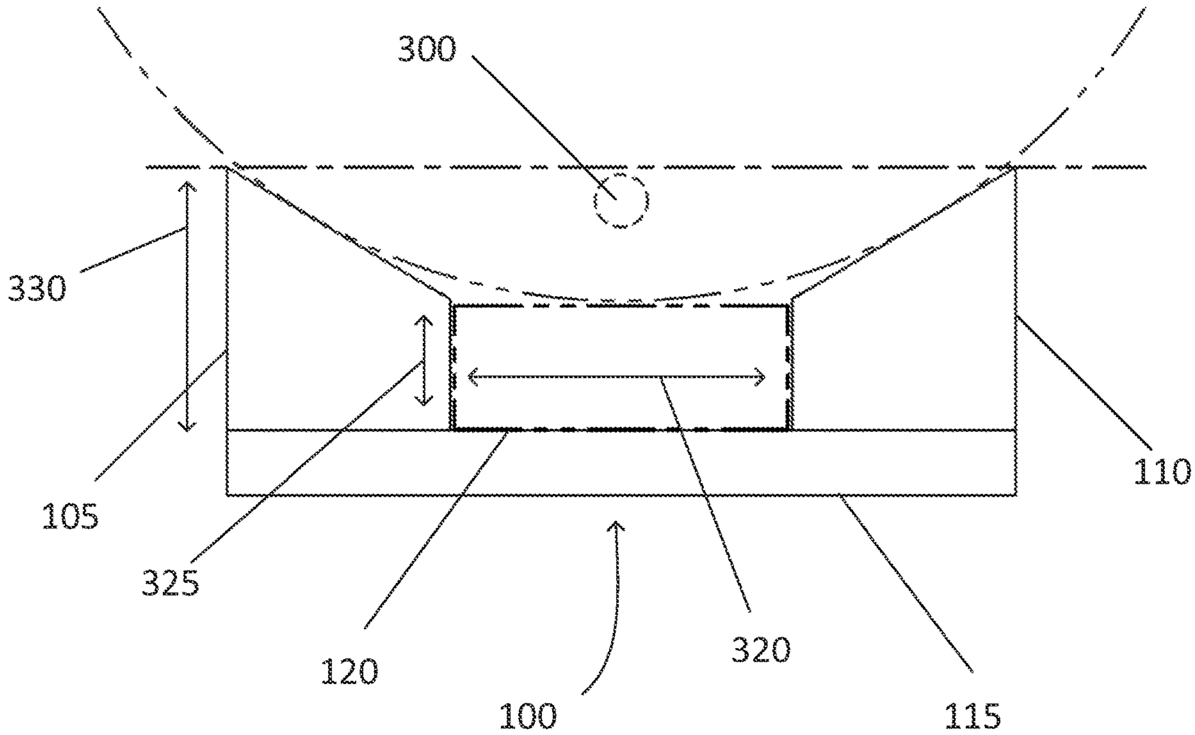
FIG. 4 is a front view diagram illustrating an example of a magnet system capable of generating a magnetic field at a target region.

FIG. 4 is a diagram of a front view of an example embodiment of a magnet system 100 showing a magnetic field at a target region 300. The target region 300 may be selected in space external to the magnet system 100. The target region 300 may be selected to be a particular distance above the top surface of the backplane 115. A low-strength magnetic field may be desirable at the target region 300. In some examples, the dimensions and orientations of the magnets are selected to generate a homogeneous magnetic field at the target region 300 to be homogenous. In some examples, the dimensions and orientations of the magnets are selected to minimize distortion of the magnetic field at the target region 300. Relative dimensions and orientations of the first 105 and second 110 magnets in the magnet system 100 may affect the strength of a magnetic field generated by the first 105 and second 110 magnets at points within the selected target region 300. Relative dimensions and orientations of the first 105 and second 110 magnets in the magnet system 100 may affect the homogeneity of a magnetic field generated by the first 105 and second 110 magnets at a selected target region 300. A height dimension 325 of the third lateral surface 225 of the first 105 and second 110 magnets may be selected to minimize distortion of the magnetic field generated by the first 105 and second 110 magnets at a selected target region 300. A width dimension 320 of a first gap 120 between the third lateral surface 225 of the first magnet 105 and the third lateral surface 225 of the second magnet 110 may be selected to minimize distortion of the magnetic field generated by the first 105 and second 110 magnets at a selected target region 300.

The distance between the target region 300 and each surface of each of the first 105 and second 110 magnets may be denoted R. For the first magnet 105, a set of distances exist comprising the distances from each surface to the target region 300. The distance from the distal surface 205 to the target region 300 may be denoted $R_D$. The distance from the proximal surface 210 to the target region 300 may be denoted $R_P$. The distance from the first lateral surface 215 to the target region 300 may be denoted $R_1$. The distance from the second lateral surface 220 to the target region 300 may be denoted $R_2$. The distance from the third lateral surface 225 to the target region 300 may be denoted $R_3$. The distance from the fourth lateral surface 230 to the target region 300 may be denoted $R_4$. Together, the distances $R_D$, $R_P$, $R_1$, $R_2$, $R_3$, and $R_4$ form a set of distance which may be denoted $R_{first}$ such that $R_{first}=\{R_D, R_P, R_1, R_2, R_3, R_4\}$. For the second magnet 110, a set of distances exists comprising the distances from each surface to the target region 300. The distance from the distal surface 205 to the target region 300 may be denoted $R_D$. The distance from the proximal surface 210 to the target region 300 may be denoted $R_P$. The distance from the first lateral surface 215 to the target region 300 may be denoted $R_1$. The distance from the second lateral surface 220 to the target region 300 may be denoted $R_2$. The distance from the third lateral surface 225 to the target region 300 may be denoted $R_3$. The distance from the fourth lateral surface 230 to the target region 300 may be denoted $R_4$. Together, the distances $R_D$, $R_P$, $R_1$, $R_2$, $R_3$, and $R_4$ form a set of distance which may be denoted $R_{second}$ such that $R_{second}=\{R_D, R_P, R_1, R_2, R_3, R_4\}$.

The first 105 and second 110 magnets may be permanent magnets. The first magnet 105 may generate a magnetic field. The second magnet 110 may generate a magnetic field. As a result of the magnetic fields generated by the first 105 and second 110 magnets, a net magnetic field may be generated. It may be desirable to adjust the strength and other characteristics of the net magnetic field at particular regions external to the magnet system 100. It may be desirable to adjust the strength and other characteristics of the net magnetic field at the target region 300. The net magnetic field at the target region 300 may be represented by a relationship:

$$\vec{H} = \int_S \frac{p_{sm}}{4\pi\mu_0 R^2}\hat{a}_R ds$$

wherein

- $\vec{H}$ may represent the magnetic field generated by a magnetic surface charge density;
- $p_{sm}$ may represent the magnetic surface charge density for a given surface of interest; and
- $\hat{a}_R$ may represent a unit vector pointing in the direction from a surface of the first 105 or second 110 magnet to the target region.

For each set of values $R_{first}$ and $R_{second}$, the individual R values corresponding to the distances between surfaces of the first 105 and second 110 magnets are related to the height dimension 325 of the third lateral side of each of the first and second magnets, the width dimension 320 of the first gap between the first and second magnets, and distance above the backplane 115 at which the target region 300 is selected. These three parameters, the height dimension 325, the width dimension 320, and the location of the target region dictate the value of R for each surface of each magnet. Therefore, a computation using the above relationship, which represents the value of the net magnetic field at the selected target region 300, can be performed in which values for the height dimension 325 and the width dimension 320 can be selected in order to generate a net magnetic field with desirable features at the target region 300. The above relationship would need to be evaluated for each surface of each of the first 105 and second 100 magnets by taking the surface integral over that surface. Addition of the magnetic field generated by each surface of each magnet would give the net magnetic field at the target region 300.

In some embodiments, the height dimension 325 and the width dimension 320 may be selected to optimize the strength of the net magnetic field at the target region. The height dimension 325 and the with dimension 320 may be selected to produce a net magnetic field of great homogeneity at the target region 300. The height dimension 325 and the width dimension 320 may be selected to minimize distortion in the net magnetic field generated at the target region 300. The height dimension 325 and the width dimension 320 may be selected to produce a net magnetic field having any other desired feature or combination of desired features at the target region 300. The target region 300 may be spherical. The target region 300 may be spherical and have a diameter of about 25 millimeters. The target region 300 may be another shape. It may encompass a larger region than a sphere having a diameter of 25 millimeters. It may encompass a smaller region than a sphere having a diameter of 25 millimeters.

In some examples, the width dimension 320 may be within a range of about 90 millimeters to about 170 millimeters and the height dimension 325 may be within a range of about 35 millimeters to about 65 millimeters.

In some examples, the width dimension 320 may be within a range of about 104 millimeters to about 156 millimeters and the height dimension 325 may be within a range of about 50 millimeters to about 60 millimeters.

In some examples, the first magnet 105 may include and/or be fabricated from neodymium iron boron (NdFeB) and the second magnet 110 comprises neodymium iron boron (NdFeB). In some examples, only one of the first 105 or second 110 magnets may include and/or be fabricated from neodymium iron boron (NdFeB). In some examples, the first magnet 105 may include and/or be fabricated from samarium cobalt (SmCo) and the second magnet 110 may include and/or be fabricated from samarium cobalt (SmCo). In some examples, only one of the first 105 or second 110 magnets may include and/or be fabricated from samarium cobalt (SmCo). In some examples the first 105 and second 100 magnets may include and/or be fabricated from any permanent magnetic material or any combination of permanent magnetic materials.

Figure 5:
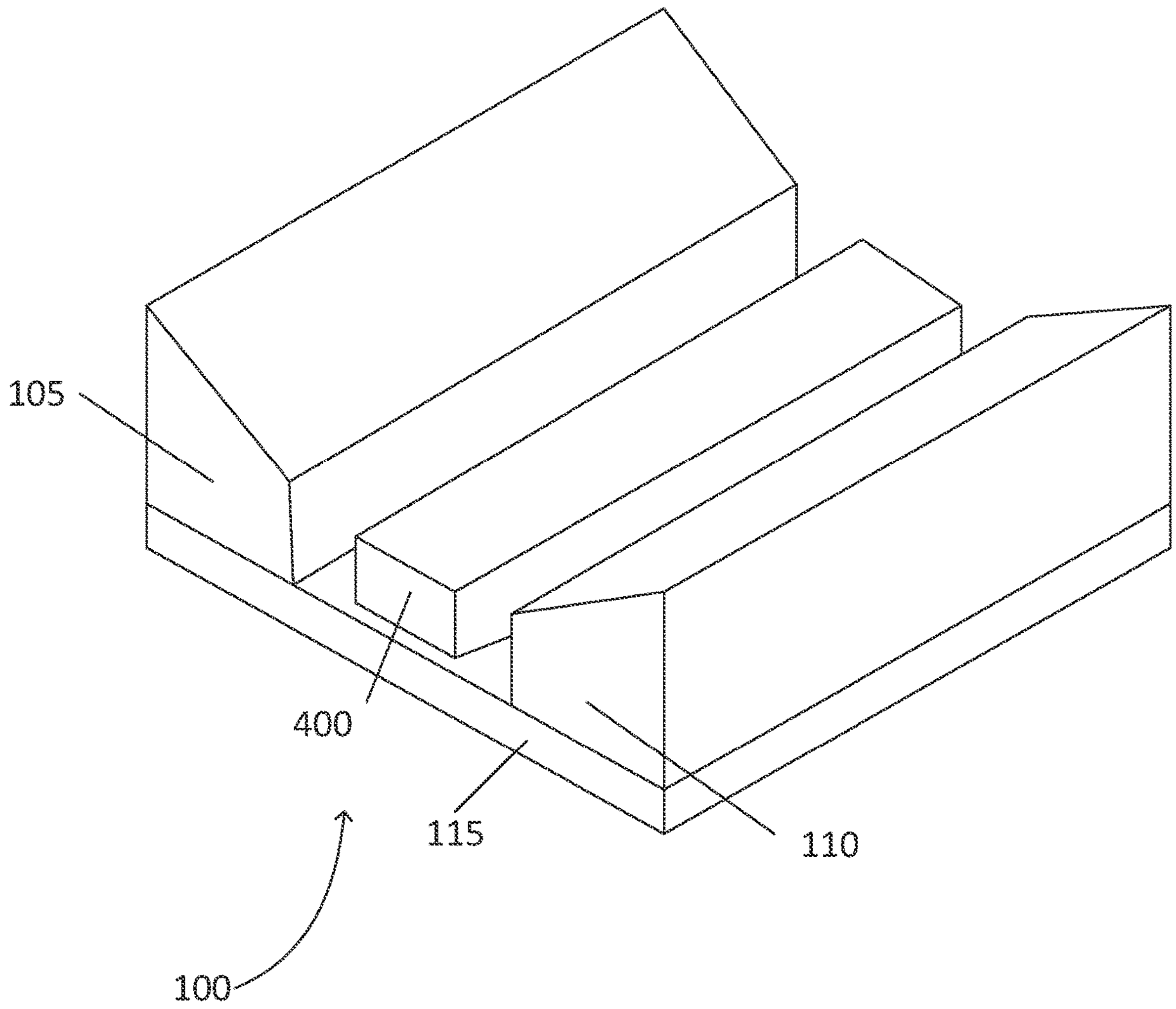
FIG. 5 is an isometric diagram illustrating an example of a magnet system having two trapezoidal prism shaped magnets and one rectangular prism shaped magnet as well as other components in accordance with an embodiment of the technology described herein.

FIG. 5 is a diagram of an isometric view of an example embodiment of the magnet system. Referring now to FIG. 5, a magnet system 100 may comprise a first magnet 105, a second magnet 110, and a backplane 115. The first magnet 105 may be located in a first position on the backplane 115. The second magnet 110 may be located in a second position on the backplane 115. A first gap 120 may be produced between the first 105 and second 110 magnets. A third magnet 400 may be located in the first gap 120.

Figure 6:
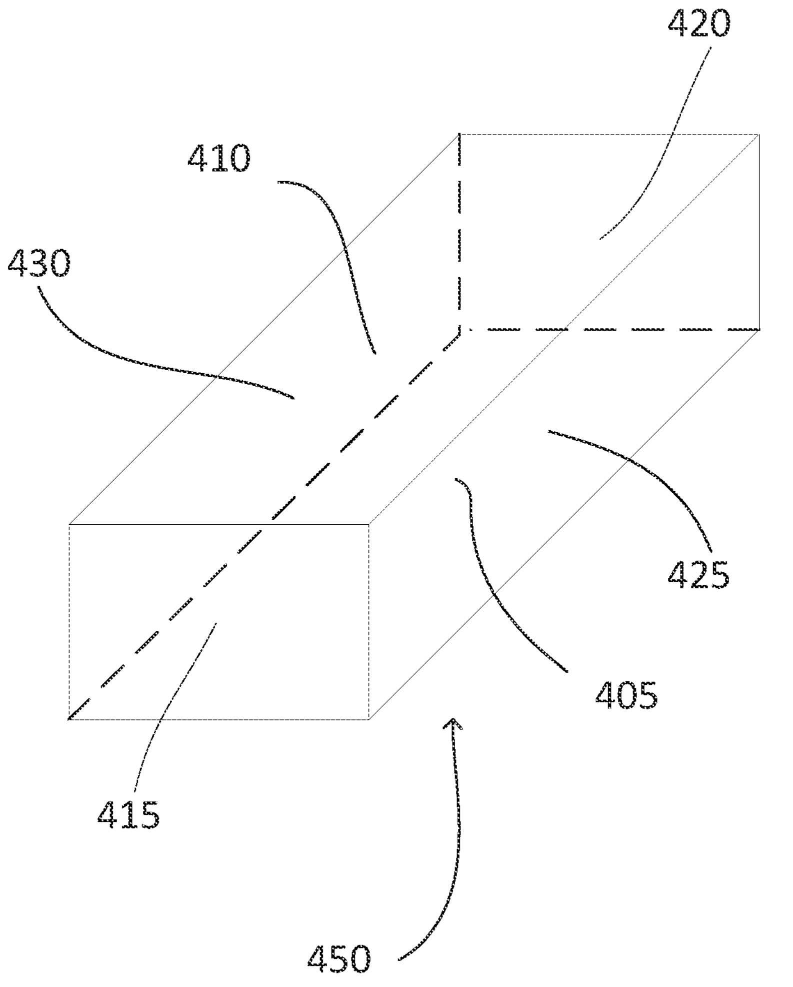
FIG. 6 is a diagram illustrating an example of a magnet shaped to form a rectangular prism.

FIG. 6 is a diagram of an example embodiment of a third magnet 400 in a magnet system 100. The third magnet 400 may be shaped to form a rectangular prism 450. The rectangular prism 450 may have a distal surface 405, a proximal surface 410, a first lateral surface 415, a second lateral surface 420, a third lateral surface 425, and a fourth lateral surface 430. The distal surface 405 may be rectangular. The proximal surface 410 may be rectangular. The first lateral surface 415 may be rectangular. The second lateral surface 420 may be rectangular. The third lateral surface 425 may be rectangular. The fourth lateral surface 430 may be rectangular. The proximal surface 410 may be opposite the distal surface 405. The first lateral surface 415 may abut the proximal 410 and distal 405 surfaces. The second lateral surface 420 may abut the proximal 410 and distal 405 surfaces. The second lateral surface 420 may be opposite the first lateral surface 415. The second lateral surface 420 may be parallel to the first lateral surface 415. The third lateral surface 425 may abut the proximal 410 and distal 405 surfaces. The third lateral surface 425 may be orthogonal to the first 415 and second 420 lateral surfaces. The fourth lateral surface 430 may abut the proximal 410 and distal 405 surfaces. The fourth lateral surface 430 may be opposite to the third lateral surface 425. The fourth lateral surface 430 may be parallel to the third lateral surface 425. The distal 405, proximal 410, first 415, second 420, third 425, and fourth 430 surfaces may conjoin to enclose an interior portion of the third 400 magnet.

Figure 7:
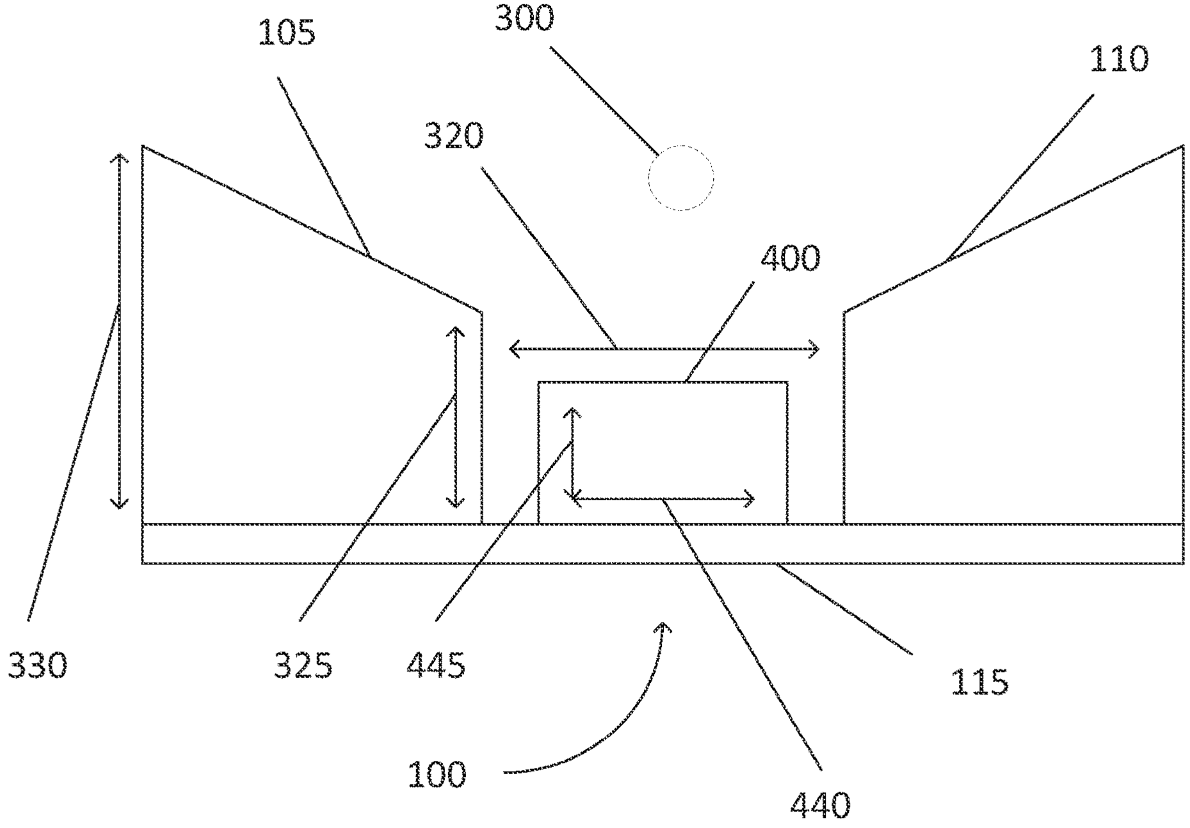
FIG. 7 is a front view diagram illustrating an example of a magnet system having three magnets and relative dimensions and orientations optimized to produce a homogenous magnetic field at a target region.

FIG. 7 is a diagram of a front view of an example embodiment of a magnet system 100 showing a magnetic field at a target region 300. The target region 300 may be selected in space external to the magnet system 100. The target region 300 may be selected to be a particular distance above the top surface of the backplane 115. A low-strength magnetic field may be desirable at the target region 300. It may be desirable for the magnetic field at the target region 300 to be homogenous. Minimized distortion of the magnetic field at the target region 300 may be desirable. Relative dimensions and orientations of the first 105, second 110, and third 400 magnets in the magnet system 100 may affect the strength of a magnetic field generated by the first 105 and second 110 magnets at a selected target region 300. Relative dimensions and orientations of the first 105, second 110, and third 400 magnets in the magnet system 100 may affect the homogeneity of a magnetic field generated by the first 105 and second 110 magnets at a selected target region 300. A height dimension 325 of the third lateral surface 225 of the first 105 and second 110 magnets may be selected to minimize distortion of the magnetic field generated by the first 105 and second 110 magnets at a selected target region 300. A width dimension 320 of a first gap 120 between the third lateral surface 225 of the first magnet 105 and the third lateral surface 225 of the second magnet 110 may be selected to minimize distortion of the magnetic field generated by the first 105 and second 110 magnets at a selected target region 300. A width dimension 440 of the third magnet 400 may be selected to minimize distortion of the magnetic field generated by the first 105 and second 110 magnets at the selected target region 300. A height dimension 445 of the third magnet 400 may be selected to minimize distortion of the magnetic field generated by the first 105 and second 110 magnets at the selected target region 300.

The distance between the target region 300 and each surface of each of the first 105, second 110, and third 400 magnets may be denoted R. For the first magnet 105, a set of distances exist comprising the distances from each surface to the target region 300. The distance from the distal surface 205 to the target region 300 may be denoted $R_D$. The distance from the proximal surface 210 to the target region 300 may be denoted $R_P$. The distance from the first lateral surface 215 to the target region 300 may be denoted $R_1$. The distance from the second lateral surface 220 to the target region 300 may be denoted $R_2$. The distance from the third lateral surface 225 to the target region 300 may be denoted $R_3$. The distance from the fourth lateral surface 230 to the target region 300 may be denoted $R_4$. Together, the distances $R_D$, $R_P$, $R_1$, $R_2$, $R_3$, and $R_4$ form a set of distance which may be denoted $R_{first}$ such that $R_{first}=\{R_D, R_P, R_1, R_2, R_3, R_4\}$. For the second magnet 110, a set of distances exists comprising the distances from each surface to the target region 300. The distance from the distal surface 205 to the target region 300 may be denoted $R_D$. The distance from the proximal surface 210 to the target region 300 may be denoted $R_P$. The distance from the first lateral surface 215 to the target region 300 may be denoted $R_1$. The distance from the second lateral surface 220 to the target region 300 may be denoted $R_2$. The distance from the third lateral surface 225 to the target region 300 may be denoted $R_3$. The distance from the fourth lateral surface 230 to the target region 300 may be denoted $R_4$. Together, the distances $R_D$, $R_P$, $R_1$, $R_2$, $R_3$, and $R_4$ form a set of distance which may be denoted $R_{second}$ such that $R_{second}=\{R_D, R_P, R_1, R_2, R_3, R_4\}$. For the third magnet 400, a set of distances exists comprising the distances from each surface to the target region 300. The distance from the distal surface 405 to the target region 300 may be denoted $R_D$. The distance from the proximal surface 410 to the target region 300 may be denoted $R_P$. The distance from the first lateral surface 415 to the target region 300 may be denoted $R_1$. The distance from the second lateral surface 420 to the target region 300 may be denoted $R_2$. The distance from the third lateral surface 425 to the target region 300 may be denoted $R_3$. The distance from the fourth lateral surface 430 to the target region 300 may be denoted $R_4$. Together, the distances $R_D$, $R_P$, $R_1$, $R_2$, $R_3$, and $R_4$ form a set of distance which may be denoted $R_{third}$ such that $R_{third}=\{R_D, R_P, R_1, R_2, R_3, R_4\}$.

The first 105 and second 110 magnets may be permanent magnets. The first magnet 105 may generate a magnetic field. The second magnet 110 may generate a magnetic field. The third magnet 400 may be a permanent magnet. The third magnet 400 may generate a magnetic field and the field generated by the third magnet 400 may have a corrective influence on the field generated by the first 105 and second 110 magnets. As a result of the magnetic fields generated by the first 105, second 110, and third 400 magnets, a net magnetic field may be generated. It may be desirable to adjust the strength and other characteristics of the net magnetic field at particular regions external to the magnet system 100. It may be desirable to adjust the strength and other characteristics of the net magnetic field at the target region 300. The net magnetic field at the selected target region 300 may be represented by a relationship:

$$\vec{H} = \int_S \frac{p_{sm}}{4\pi\mu_0 R^2} \hat{a}_R ds$$

wherein $\vec{H}$ may represent the magnetic field generated by a magnetic surface charge density;

$p_{sm}$ may represent the magnetic surface charge density for a given surface of interest; and $\hat{a}_R$ may represent a unit vector pointing in the direction from a surface of the first 105, second 110, or third 400 magnet to the target region.

For each set of values $R_{first}$, $R_{second}$, and $R_{third}$, the individual R values corresponding to the distances between surfaces of the first 105, second 110, and third 400 magnets are related to the height dimension 325 of the third lateral side of each of the first and second magnets, the width dimension 320 of the first gap between the first and second magnets, the width dimension 440 of the third magnet 400, the height dimension 445 of the third magnet 400, and the distance above the backplane 115 at which the target region 300 is selected. These five parameters, the height dimension 325, the width dimension 320, the width dimension 440, the height dimension 445, and the location of the target region dictate the value of R for each surface of each magnet. Therefore, a computation using the above relationship, which represents the value of the net magnetic field at the selected target region 300, can be performed in which values for the height dimension 325, the width dimension 320, the width dimension 445, and the width dimension 440, can be selected in order to generate a net magnetic field with desirable features at the target region 300. The above relationship would need to evaluated for each surface of each of the first 105, second 100, and third 400 magnets by taking the surface integral over that surface. Then, addition of the magnetic field generated by each surface of each of each magnet would give the net magnetic field at the target region 300.

In an embodiment, the height dimension 325, the width dimension 320, the width dimension 445, and the width dimension 440 may be selected to optimize the strength of the net magnetic field at the target region. The height dimension 325, the width dimension 320, the width dimension 445, and the width dimension 440 may be selected to produce a net magnetic field of great homogeneity at the target region 300. The height dimension 325, the width dimension 320, the width dimension 445, and the width dimension 440 may be selected to minimize distortion in the net magnetic field generated at the target region 300. The height dimension 325, the width dimension 320, the width dimension 445, and the width dimension 440 may be selected to produce a net magnetic field having any other desired feature or combination of desired features at the target region 300. In some examples, the target region 300 may be spherical. In some examples, the target region 300 may be spherical and have a diameter of about 25 millimeters. In other examples, the target region may be a spheroid, a cube, a prism, a pyramid, or other three-dimensional shapes.

In some examples, the width dimension 320 may be within a range of about 90 millimeters to about 170 millimeters, the height dimension 325 may be within a range of about 35 millimeters to about 65 millimeters, the width dimension 440 may be within a range of about 42 millimeters to about 78 millimeters, and the height dimension 445 may be within a range of about 20 millimeters to about 38 millimeters.

In some examples, the width dimension 320 may be within a range of about 104 millimeters to about 156 millimeters, the height dimension 325 may be within a range of about 50 millimeters to about 60 millimeters, the width dimension 440 may be within a range of about 48 millimeters to about 72 millimeters, and the height dimension 445 may be within a range of about 23 millimeters to about 35 millimeters.

As shown in FIG. 9, the proximal surface 210 of either the first 105 or second 110 magnet need not be linear. The proximal 210 surface may be curved. The proximal surface 210 may have a stair-stepped form.

Figure 8:
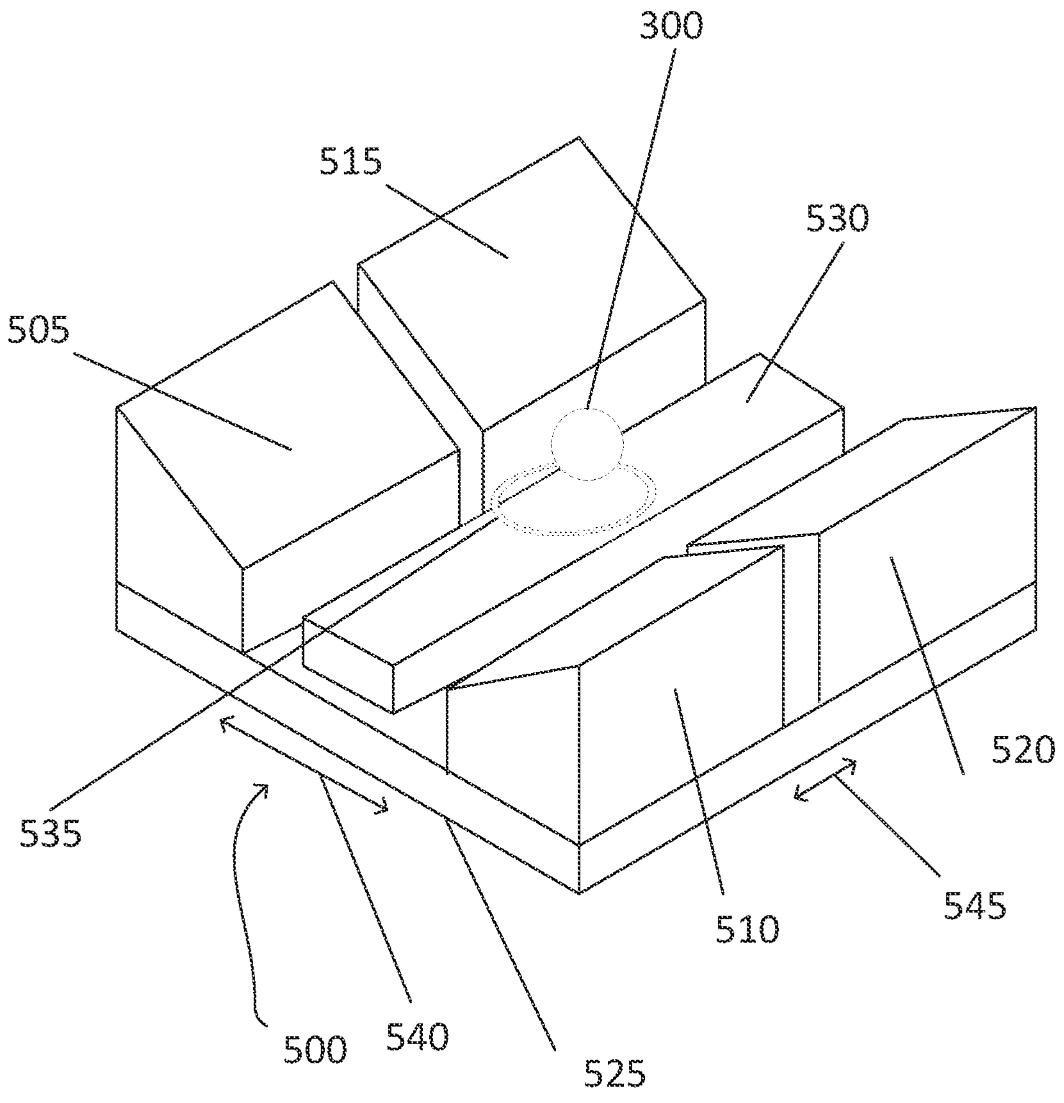
FIG. 8 is an isometric view of a kit having four primary magnets and one secondary magnet as well as other components in accordance with an embodiment of the technology described herein.
Figure 9A:
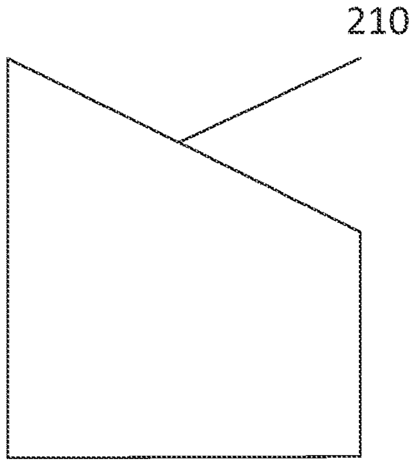
FIG. 9A is a diagram illustrating an example of a linear proximal surface for a trapezoidal prism shaped magnet.
Figure 9B:
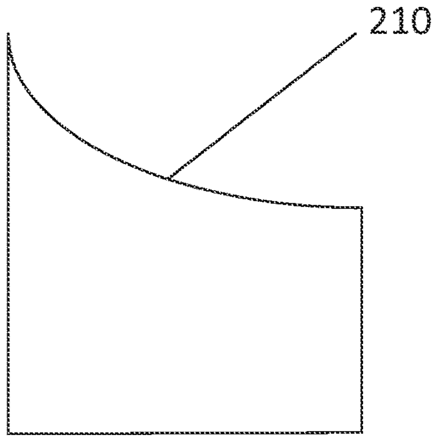
FIG. 9B is a diagram illustrating an example of a curved proximal surface for a trapezoidal prism shaped magnet.
Figure 9C:
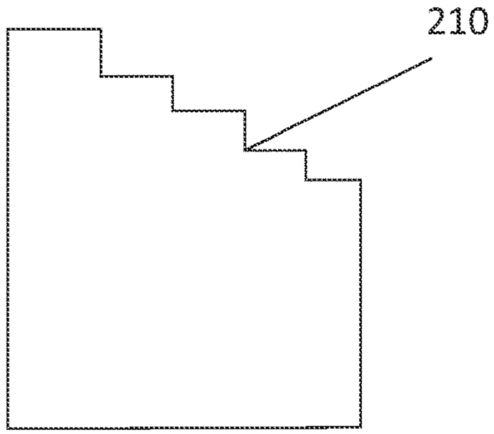
FIG. 9C is a diagram illustrating an example of a stair-stepped proximal surface for a trapezoidal prism shaped magnet.
Figure 9D:
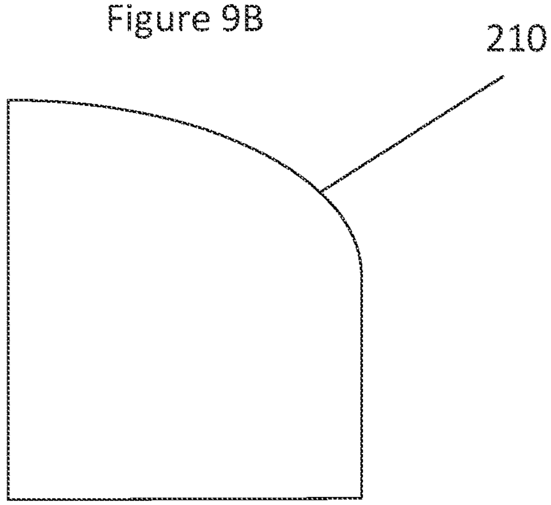
FIG. 9D is a diagram illustrating an example of a curved proximal surface for a trapezoidal prism shaped magnet.
Figure 9E:
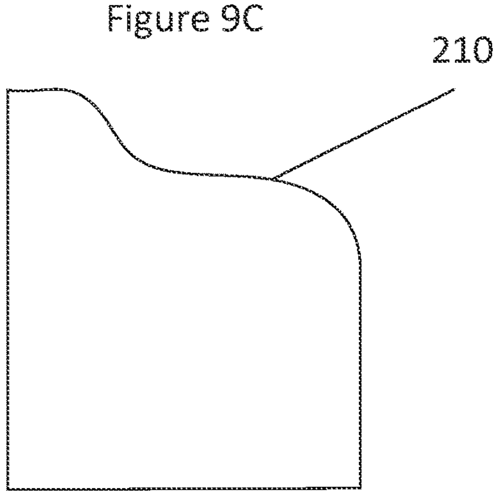
FIG. 9E is a diagram illustrating an example of a curved proximal surface for a trapezoidal prism shaped magnet.

FIG. 8 is a diagram of an isometric view of an example embodiment of a kit 500 for use in NMR. Referring now to FIG. 8, a kit 500 may comprise one or more primary magnets 505, 510, 515, 520, one or more secondary magnets 530, a backplane 525, and a radio frequency coil 535.

The primary magnets 505, 510, 515, 520 in the kit 500 may be shaped to form a trapezoidal prism, as shown in FIG. 2. The term trapezoidal is defined to include traditional linear trapezoids as well as shapes having a near trapezoidal form, including shapes with a curved proximal edge. Referring back to FIG. 2, he trapezoidal prism 200 may have a distal surface 205, a proximal surface 210, a first lateral surface 215, a second lateral surface 220, a third lateral surface 225, and a fourth lateral surface 230. The distal surface 205 may be rectangular. The proximal surface 210 may be rectangular. The first lateral surface 215 may be trapezoidal. The first lateral surface 215 may be right-trapezoidal. The second lateral surface 220 may be trapezoidal. The second lateral surface 225 may be right-trapezoidal. The third lateral surface 225 may be rectangular. The fourth lateral surface 230 may be rectangular. The proximal surface 210 may be opposite the distal surface 205. The first lateral surface 215 may abut proximal 210 and distal 205 surfaces. The second lateral surface 220 may abut the proximal 210 and distal 205 surfaces. The second lateral surface 220 may be opposite the first lateral surface 215. The second lateral surface 220 may be parallel to the first lateral surface 215. The third lateral surface 225 may abut the proximal 210 and distal 205 surfaces. The third lateral surface 225 may be orthogonal to the first 215 and second 220 lateral surfaces. The fourth lateral surface 230 may abut the proximal 210 and distal 205 surfaces. The fourth lateral surface 230 may be opposite to the third lateral surface 225. The fourth lateral surface 230 may be parallel to the third lateral surface 225. The distal 205, proximal 210, first 215, second 220, third 225, and fourth 230 surfaces may conjoin to enclose an interior portion of a primary magnet 505, 510, 515, 520.

The secondary magnet 530 in the kit 500 may shaped to form a rectangular prism, as shown in FIG. 6. Referring back to FIG. 6, the rectangular prism 450 may have a distal surface 405, a proximal surface 410, a first lateral surface 415, a second lateral surface 420, a third lateral surface 425, and a fourth lateral surface 430. The distal surface 405 may be rectangular. The proximal surface 410 may be rectangular. The first lateral surface 415 may be rectangular. The second lateral surface 420 may be rectangular. The third lateral surface 425 may be rectangular. The fourth lateral surface 430 may be rectangular. The proximal surface 410 may be opposite the distal surface 405. The first lateral surface 415 may abut the proximal 410 and distal 405 surfaces. The second lateral surface 420 may abut the proximal 410 and distal 405 surfaces. The second lateral surface 420 may be opposite the first lateral surface 415. The second lateral surface 420 may be parallel to the first lateral surface 415. The third lateral surface 425 may abut the proximal 410 and distal 405 surfaces. The third lateral surface 425 may be orthogonal to the first 415 and second 420 lateral surfaces. The fourth lateral surface 430 may abut the proximal 410 and distal 405 surfaces. The fourth lateral surface 430 may be opposite to the third lateral surface 425. The fourth lateral surface 430 may be parallel to the third lateral surface 425. The distal 405, proximal 410, first 415, second 420, third 425, and fourth 430 surfaces may conjoin to enclose an interior portion of the secondary magnet 530.

In an embodiment of the kit 500, the proximal surface 210 of a first primary magnet 505 may be angled at an acute angle relative to the distal surface 205 of the first primary magnet 505. In this embodiment, a height dimension 330 of the fourth lateral surface 230 of the first primary magnet 505 may be greater than a height dimension 325 of the third lateral surface 225 of the first primary magnet 505. In an embodiment of the kit 500, the proximal surface 210 of a second primary magnet 510 may be angled at an acute angle relative to the distal surface 205 of the second primary magnet 510. In this embodiment, a height dimension 330 of the fourth lateral surface 230 of the second primary magnet 510 may be greater than a height dimension 325 of the third lateral surface 225 of the second primary magnet 510. In an embodiment of the kit 500, the degree at which the proximal surface 210 of the first primary magnet 505 is angled relative to the distal surface 205 of the first primary magnet 505 may be different than the degree at which the proximal surface 210 of the second primary magnet 510 is angled relative to the distal surface 205 of the second primary magnet 510.

In another embodiment, as shown in FIG. 8, a kit 500 may have at least four primary magnets 505, 510, 515, 520. A first primary magnet 505 may located at a first position on a top surface of the backplane 525. The distal surfaces 205 of the first 505 and second 510 primary magnets may abut the top surface of the backplane. The third lateral surface 225 of the first primary magnet 505 may be proximal and parallel to the third lateral surface 225 of the second primary magnet 510 forming a first gap 540 between the first primary magnet 505 and the second primary magnets 510. A third primary magnet 515 may be located on the top surface of the backplane 525. The third primary magnet 515 and the first primary magnet 505 may be consecutively positioned. The distal surface 205 of the third primary magnet 515 may abut the backplane 525. The second lateral surface 220 of the first primary magnet 505 may be proximal and parallel to the first lateral surface 215 of the third primary magnet 515. A second gap 545 may be formed between the first primary magnet 505 and the third primary magnet 515. A fourth primary magnet 520 may be located at a fourth position on the top surface of the backplane 525. The distal surface 205 of the fourth primary magnet 520 may abut the backplane 525. The third lateral surface 225 of the third primary magnet 515 may be proximal and parallel to the third lateral surface 225 of the fourth primary magnet 520. A gap may be formed between the third 515 and fourth 520 primary magnets. The fourth primary magnet 520 and the second primary magnet 510 may be consecutively positioned. The second lateral surface 220 of the second primary magnet 510 may be proximal and parallel to the first lateral surface 515 of the fourth primary magnet 520. A gap may be formed between the second primary magnet 510 and the fourth primary magnet 520. The kit 500 may contain any number of magnet pairs. Any subsequent magnet pair 555, e.g., a fifth and sixth primary magnet, may be positioned relative to the preceding pair of primary magnets, e.g., the third and fourth primary magnets, in the same way that the third and fourth primary magnets are positioned relative to the first and second primary magnet. The result of positioned subsequent pairs of magnets may be that a gap is formed that runs through the center of the kit 500. Secondary magnets 530 may be positioned in this gap.

As shown in FIG. 9, the proximal surface 210 of a primary magnet need not be linear. The proximal 210 surface may be curved. The proximal surface 210 may have a stair-stepped form.

Figure 10:
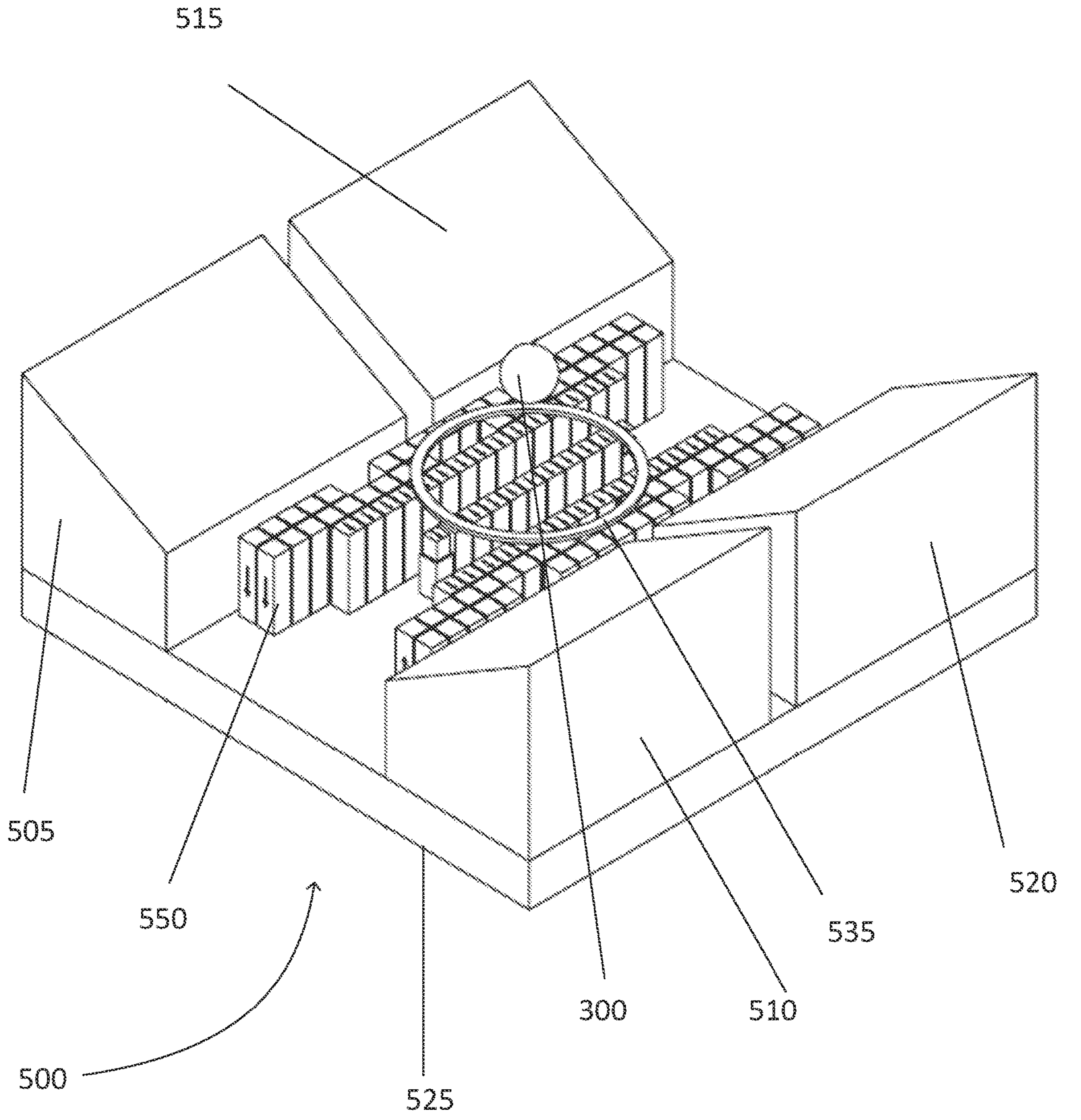
FIG. 10 is an isometric diagram illustrating an example of a kit comprising shimming magnets as well as other components in accordance with the technology described herein.

As shown in FIG. 10, shimming magnets 550 may be placed in the gap that spans the magnet kit 500, according to the above discussed embodiment. Other types of magnets with a field correcting, strengthening, homogenizing, or stabilizing function may be placed in this gap. Magnetic material, such as ferrous material, may be placed in this gap. Other types of magnetic material may be placed in this gap.

Figure 11:
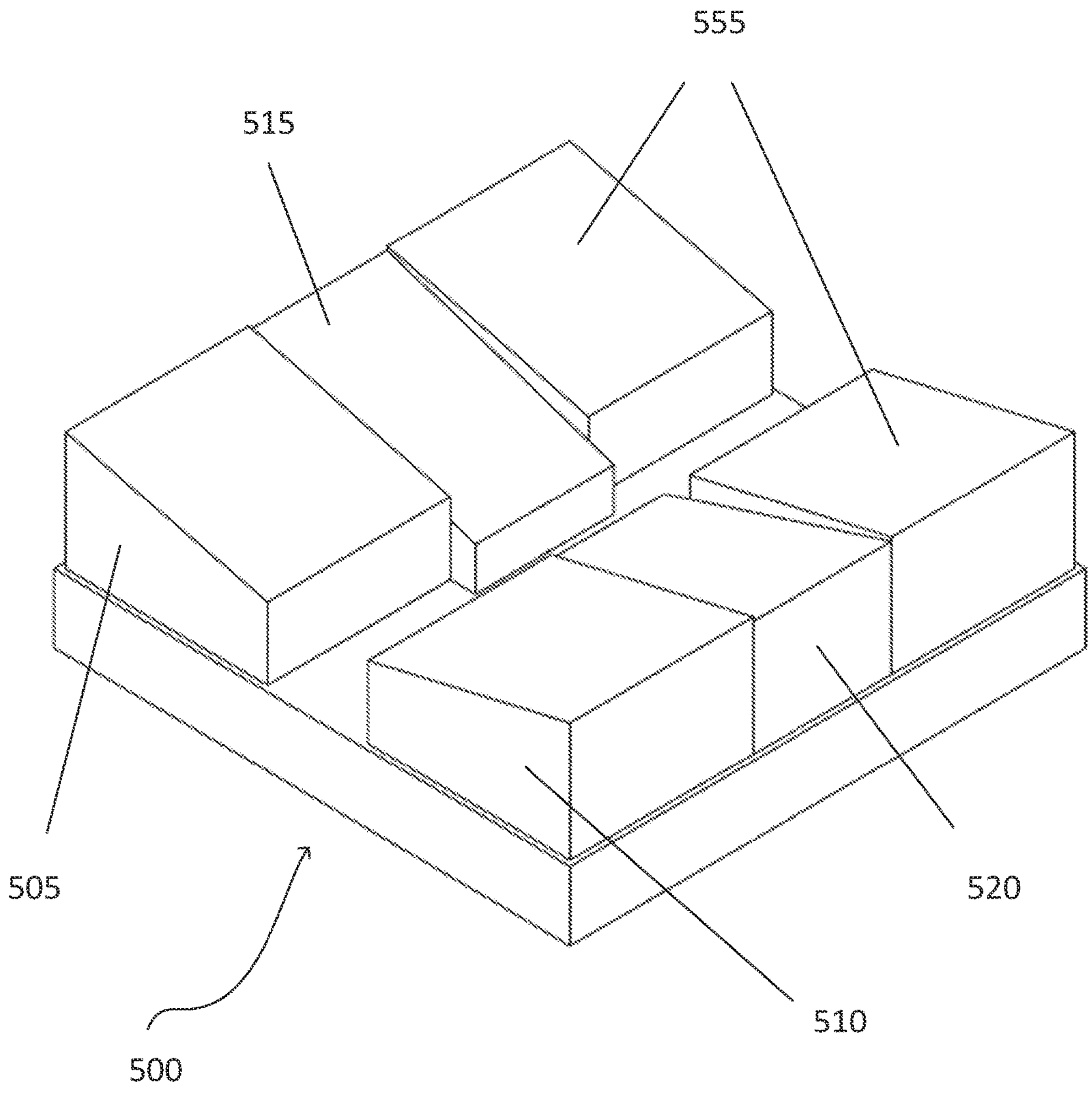
FIG. 11 is an isometric diagram illustrating an example of a kit comprising variably sized and angled primary magnets as well as other components in accordance with the technology described herein.

As shown in FIG. 11, the primary magnets may have different dimensions. For each primary magnet 505, 510, 515, 520, 555 the acute angle at which the proximal surface 210 is angled relative to the distal surface 205 may be different than for another or other primary magnets 505, 510, 515, 520, 555.

In an embodiment of the disclosure, all primary magnets 505, 510, 515, 520, 555 comprise neodymium iron boron (NdFeB). In another embodiment, any but not necessary all primary magnets 505, 510, 515, 520, 555 may comprise neodymium iron boron (NdFeB). In another embodiment all primary magnets 505, 510, 515, 520, 555 comprise samarium cobalt (SmCo). In another embodiment, any but not necessary all primary magnets 505, 510, 515, 520, 555 may comprise samarium cobalt (SmCo). In another embodiment any or all primary magnets 505, 510, 515, 520, 555 may comprise any permanent magnetic material or any combination of permanent magnetic materials.

FIG. 8 shows a kit 500 generating a magnetic field at a target region 300. The target region 300 may be selected in space external to the kit 500. The target region 300 may be selected to be a particular distance above the top surface of the backplane 525. A low-strength magnetic field may be desirable at the target region 300. It may be desirable for the magnetic field at the target region 300 to be homogenous. Minimized distortion of the magnetic field at the target region 300 may be desirable. Relative dimensions and orientations of the primary 505, 510, 515, 520 and secondary 530 magnets in the kit 500 may affect the strength of a magnetic field generated by the primary magnets 505, 510, 515, 520 at a selected target region 300. Relative dimensions and orientations of the primary 505, 510, 515, 520 and secondary 530 magnets in the kit 500 may affect the homogeneity of a magnetic field generated by the primary magnets 505, 510, 515, 520 at a selected target region 300. A height dimension 325 of the third lateral surface 225 of the primary magnets 505, 510, 515, 520 may be selected to minimize distortion of the magnetic field generated by the primary magnets 505, 510, 515, 520 at a selected target region 300. A width dimension of a first gap 540 between the third lateral surface 225 of the first primary magnet 505 and the third lateral surface 225 of the second primary magnet 510 may be selected to minimize distortion of the magnetic field generated by the primary magnets 505, 510, 515, 520 at a selected target region 300. A width dimension 440 of the third magnet 400 may be selected to minimize distortion of the magnetic field generated by the primary magnets 505, 510, 515, 520 at the selected target region 300. A height dimension 445 of the third magnet 400 may be selected to minimize distortion of the magnetic field generated by the primary magnets 505, 510, 515, 520 at the selected field region 300. A length dimension of the second gap 545 may be selected to minimize distortion of the magnetic field generated by the primary magnets 505, 510, 515, 520 at the selected target region 300.

The distance between the target region 300 and each surface of each primary magnet 505, 510, 515, 520 may be denoted R. For instance, for the first primary magnet 505, a set of distances exist comprising the distances from each surface to the target region 300. The distance from the distal surface 205 to the target region 300 may be denoted $R_D$. The distance from the proximal surface 210 to the target region 300 may be denoted $R_P$. The distance from the first lateral surface 215 to the target region 300 may be denoted $R_1$. The distance from the second lateral surface 220 to the target region 300 may be denoted $R_2$. The distance from the third lateral surface 225 to the target region 300 may be denoted $R_3$. The distance from the fourth lateral surface 230 to the target region 300 may be denoted $R_4$. Together, the distances $R_D$, $R_P$, $R_1$, $R_2$, $R_3$, and $R_4$ form a set of distance which may be denoted $R_{P1}$ such that $R_{P1}=\{R_D, R_P, R_1, R_2, R_3, R_4\}$. A corresponding set of distances R may be determined for each additional primary magnet. The sets of distances for the first through the nth primary magnet may be denoted as $R_{Pn}$.

The distance between the target region 300 and each surface of each secondary magnet 530 may be denoted R. For instance, for the first secondary magnet, a set of distances exist comprising the distances from each surface to the target region 300. The distance from the distal surface 205 to the target region 300 may be denoted $R_D$. The distance from the proximal surface 210 to the target region 300 may be denoted $R_P$. The distance from the first lateral surface 215 to the target region 300 may be denoted $R_1$. The distance from the second lateral surface 220 to the target region 300 may be denoted $R_2$. The distance from the third lateral surface 225 to the target region 300 may be denoted $R_3$. The distance from the fourth lateral surface 230 to the target region 300 may be denoted $R_4$. Together, the distances $R_D$, $R_P$, $R_1$, $R_2$, $R_3$, and $R_4$ form a set of distance which may be denoted $R_{S1}$ such that $R_{S1}=\{R_D, R_P, R_1, R_2, R_3, R_4\}$. A corresponding set of distances R may be determined for each additional secondary magnet. The sets of distances for the first through the nth primary magnet may be denoted as $R_{Sn}$.

The primary magnets 505, 510, 515, 520 may be permanent magnets. The primary 505, 510, 515, 520 magnets may generate a magnetic field. The secondary magnets 530 may be permanent magnets. The secondary magnets 530 may generate magnetic fields and the fields generated by the secondary magnets 530 may have a corrective influence on the field generated by the primary magnets 505, 510, 515, 520. As a result of the magnetic fields generated by the primary magnets 505, 510, 515, 520 and secondary magnets 530, a net magnetic field may be generated. It may be desirable to adjust the strength and other characteristics of the net magnetic field at particular regions external to the kit 500. It may be desirable to adjust the strength and other characteristics of the net magnetic field at the target region 300. The net magnetic field at the selected target region 300 may be represented by a relationship:

$$\vec{H} = \int_S \frac{p_{sm}}{4\pi\mu_0 R^2}\hat{a}_R ds$$

wherein $\vec{H}$ may represent the magnetic field generated by a magnetic surface charge density;

$p_{sm}$ may represent the magnetic surface charge density for a given surface of interest; and $\hat{a}_R$ may represent a unit vector pointing in the direction from a surface of the primary magnets 505, 510, 515, 520 and secondary magnets 530 to the target region.

For each set of values $R_{Pn}$, and $R_{Sn}$, the individual R values corresponding to the distances between surfaces of the primary magnets 505, 510, 515, 520 are related to the height dimension 325 of the third lateral side of each primary magnet 505, 510, 515, 520, the width dimension of the first gap 540 between the first and second magnets, the with dimension 440 of the secondary magnet 530, the height dimension 445 of the secondary magnet 530, the length dimension 545 of the second gap, and the distance above the backplane 525 at which the target region 300 is selected. These six parameters, the height dimension 325, the width dimension 540, the width dimension 440, the height dimension 445, the length dimension 545, and the location of the target region dictate the value of R for each surface of each magnet. Therefore, a computation using the above relationship, which represents the value of the net magnetic field at the selected target region 300, can be performed in which values for the height dimension 325, the width dimension 540, the width dimension 445, the width dimension 440, and the length dimension 545, can be selected in order to generate a net magnetic field with desirable features at the target region 300. The above relationship would need to be evaluated for each surface of each of the primary 505, 510, 515, 520 and secondary 530 magnets by taking the surface integral over that surface. Then, addition of the magnetic field generated by each surface of each of each magnet would give the net magnetic field at the target region 300.

In an embodiment, the height dimension 325, the width dimension 540, the width dimension 445, the width dimension 440, and the length dimension 545, may be selected to optimize the strength of the net magnetic field at the target region. The height dimension 325, the width dimension 540, the width dimension 445, the width dimension 440, and the length dimension 545, may be selected to produce a net magnetic field of great homogeneity at the target region 300. The height dimension 325, the width dimension 540, the width dimension 445, the width dimension 440, and the length dimension 545, may be selected to minimize distortion in the net magnetic field generated at the target region 300. The height dimension 325, the width dimension 540, the width dimension 445, the width dimension 440, and the length dimension 545, may be selected to produce a net magnetic field having any other desired feature or combination of desired features at the target region 300. The target region 300 may be spherical. The target region 300 may be spherical and have a diameter of about 25 millimeters. The target region 300 may be another shape. It may encompass a larger region than a sphere having a diameter of 25 millimeters. It may encompass a smaller region than a sphere having a diameter of 25 millimeters.

In an embodiment, the width dimension 540 may be within a range of about 90 millimeters to about 170 millimeters, the height dimension 325 may be within a range of about 35 millimeters to about 65 millimeters, the width dimension 440 may be within a range of about 42 millimeters to about 78 millimeters, the height dimension 445 may be within a range of about 20 millimeters to about 38 millimeters, and the length dimension 545 may be within a range of about 10 millimeters to about 18 millimeters.

In another embodiment, the width dimension 540 may be within a range of about 104 millimeters to about 156 millimeters, the height dimension 325 may be within a range of about 50 millimeters to about 60 millimeters, the width dimension 440 may be within a range of about 48 millimeters to about 72 millimeters, the height dimension 445 may be within a range of about 23 millimeters to about 35 millimeters, and the length dimension 545 may be within a range of about 11 millimeters to about 17 millimeters.

Figure 12:
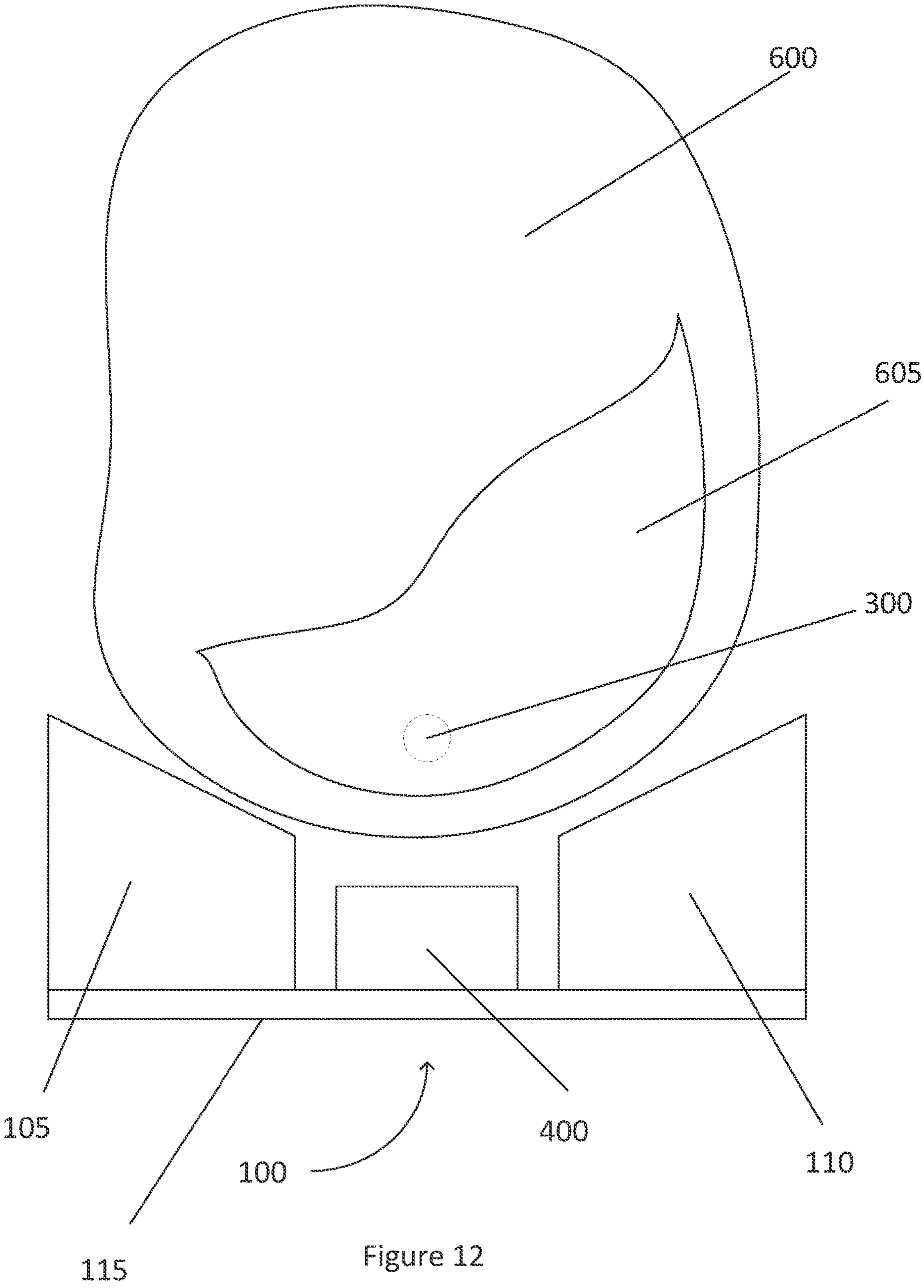
FIG. 12 is a front view diagram illustrating an example of a magnet system in use in performing NMR measurements of a human liver.

FIG. 12 is a diagram of a front view of an example embodiment of the magnet system 100 in use in making in vivo measurements in a human liver 605. The magnet system 100 may include a first magnet 105, a second magnet 110, a third magnet 400, and a backplane 115. The first and second magnets may generate a magnetic field. The magnetic field maybe be optimized at a target region 300. The target region may be located a selected distance above the backplane 115. The target region may be located at a distance such that that, when the magnet system 100 is sited around a human torso 600 the target region is in a region of pure liver in a high percentage of patients.

While various embodiments of the present disclosure have been described above, it should be understood that they have been presented by way of example only, and not of limitation. Likewise, the various diagrams may depict an example architectural or other configuration for the technology, which is done to aid in understanding the features and functionality that can be included in the disclosure. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various example embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the disclosed technology should not be limited by any of the above-described example embodiments. As used herein, the term "about" indicates a value ranging from two percent below the given value to two percent above the given value.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide example instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of example block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for adjusting a net magnetic field at a target region using a magnet system in a nuclear magnetic resonance ("NMR") apparatus, the method comprising:

selecting the target region in space external to the magnet system; and generating, with the magnet system, a net magnetic field at the target region, wherein the magnet system comprises:

a first magnet;

a second magnet; and a backplane;

the first magnet having:

a distal surface;

a proximal surface opposite the distal surface;

a first lateral surface abutting the proximal and distal surfaces;

a second lateral surface abutting the proximal and distal surfaces and opposite to the first lateral surface;

a third lateral surface abutting the proximal and distal surfaces and adjacent to the first and second lateral surfaces; and a fourth lateral surface abutting the proximal and distal surfaces and opposite to the third lateral surface;

the distal, proximal, first, second, third, and fourth surfaces conjoining to enclose an interior portion of the first magnet;

the second magnet having:

a distal surface;

a proximal surface opposite the distal surface;

a first lateral surface abutting the proximal and distal surfaces;

a second lateral surface abutting the proximal and distal surfaces and opposite to the first lateral surface;

a third lateral surface abutting the proximal and distal surfaces and adjacent to the first and second lateral surfaces; and a fourth lateral surface abutting the proximal and distal surfaces and opposite to the third lateral surface;

the distal, proximal, first, second, third, and fourth surfaces conjoining to enclose an interior portion of the second magnet; and wherein the first magnet is located at a first position and the second magnet is located at a second position, such that a first gap is produced between the first magnet and the second magnet.

2. The method of claim 1, wherein:

the proximal surface of the first magnet is, on average, angled at an acute angle relative to the distal surface of the first magnet, such that a height dimension of the fourth surface of the first magnet is greater than a height dimension of the third surface of the first magnet; and the proximal surface of the second magnet is, on average, angled at an acute angle relative to the distal surface of the second magnet, such that a height dimension of the fourth surface of the second magnet is greater than a height dimension of the third surface of the second magnet.

3. The method of claim 2, wherein:

the target region is a distance, "D," from the backplane; and the set of relative dimensions and orientations of the first, and second magnets comprises:

a height dimension, "A," of the third lateral surface of the first and second magnets; and a width dimension, "E," of the first gap;

wherein A and E are selected to optimize the net magnetic field at the target region.

4. The method of claim 3, wherein:

$R_{first}$ denotes a set of distances, $\{R_D, R_P, R_1, R_2, R_3, R_4\}$, from points on the corresponding distal, proximal, first lateral, second lateral, third lateral, and fourth lateral surfaces $\{S_D, S_P, S_1, S_2, S_3, S_4\}$ of the first magnet to the target region;

$R_{second}$ denotes a set of distances, $\{R_D, R_P, R_1, R_2, R_3, R_4\}$, from points on the corresponding distal, proximal, first lateral, second lateral, third lateral, and fourth lateral surfaces $\{S_D, S_P, S_1, S_2, S_3, S_4\}$ of the second magnet to the target region; and the net magnetic field at the target region is represented by a relationship:

$$\vec{H} = \int_S \frac{p_{sm}}{4\pi\mu_0 R^2} \hat{a}_R ds$$

wherein:

$\vec{H}$ is the magnetic field generated by a magnetic surface charge density;

$p_{sm}$ is the magnetic surface charge density for a given surface of interest;

$\hat{a}_R$ is a unit vector pointing in the direction from a surface of the first or second magnet to the target region; and for $R_{first}$ and $R_{second}$, $R \propto f(A, E; D)$.

5. The method of claim 2, wherein:

the target region is a distance, "D," from the backplane; and the set of relative dimensions and orientations of the first, and second magnets comprises:

a height dimension, "A," of the third lateral surface of the first and second magnets; and a width dimension, "E," of the first gap;

wherein $R_{first}$ denotes a set of distances, $\{R_D, R_P, R_1, R_2, R_3, R_4\}$, from points on the corresponding distal, proximal, first lateral, second lateral, third lateral, and fourth lateral surfaces $\{S_D, S_P, S_1, S_2, S_3, S_4\}$ of the first magnet to the target region;

$R_{second}$ denotes a set of distances, $\{R_D, R_P, R_1, R_2, R_3, R_4\}$, from points on the corresponding distal, proximal, first lateral, second lateral, third lateral, and fourth lateral surfaces $\{S_D, S_P, S_1, S_2, S_3, S_4\}$ of the second magnet to the target region; and the net magnetic field at the target region is represented by a relationship:

$$\vec{H} = \int_S \frac{p_{sm}}{4\pi\mu_0 R^2}\hat{a}_R ds$$

wherein:

$\vec{H}$ is the magnetic field generated by a magnetic surface charge density;

$p_{sm}$ is the magnetic surface charge density for a given surface of interest;

$\hat{a}_R$ is a unit vector pointing in the direction from a surface of the first or second magnet to the target region; and for $R_{first}$ and $R_{second}$, $R \propto f(A, E; D)$ wherein A and E are selected to optimize the net magnetic field at the target region.

6. The method of claim 3, wherein, E is within a range of about 90 mm to about 170 mm, and A is within a range of about 35 mm to about 65 mm.

7. The method of claim 3, wherein, E is within a range of about 104 mm to about 156 mm, and A is within a range of about 50 mm to about 60 mm.

8. The method of claim 1 wherein the first magnet or the second magnet comprises neodymium iron boron (NdFeB).

9. The method of claim 1 wherein the first magnet or the second magnet comprises samarium cobalt (SmCo).

10. The method of claim 1, wherein the magnet system further comprises a third magnet, having:

a distal surface;

a proximal surface opposite the distal surface;

a first lateral surface abutting the proximal and distal surfaces;

a second lateral surface abutting the proximal and distal surfaces and opposite to the first lateral surface;

a third lateral surface abutting the proximal and distal surfaces and adjacent to the first and second lateral surfaces; and a fourth lateral surface abutting the proximal and distal surfaces and opposite to the third lateral surface;

the distal, proximal, first, second, third, and fourth surfaces conjoining to enclose an interior portion of the first magnet;

wherein the third magnet is located in the first gap.

11. The method of claim 8, wherein the target region is a distance, "D," from the backplane; and the set of relative dimensions and orientations of the first, second, and third magnets comprises:

a height dimension, "A," of the third lateral surface of the first and second magnets;

a width dimension, "E," of the first gap;

a width dimension, "B," of the third magnet; and a height dimension, "C," of the third magnet;

wherein $R_{first}$ denotes a set of distances, $\{R_D, R_P, R_1, R_2, R_3, R_4\}$, from points on the corresponding distal, proximal, first lateral, second lateral, third lateral, and fourth lateral surfaces $\{S_D, S_P, S_1, S_2, S_3, S_4\}$ of the first magnet to the target region;

$R_{second}$ denotes a set of distances, $\{R_D, R_P, R_1, R_2, R_3, R_4\}$, from points on the corresponding distal, proximal, first lateral, second lateral, third lateral, and fourth lateral surfaces $\{S_D, S_P, S_1, S_2, S_3, S_4\}$ of the second magnet to the target region;

$R_{third}$ denotes a set of distances, $\{R_D, R_P, R_1, R_2, R_3, R_4\}$, from points on the corresponding distal, proximal, first lateral, second lateral, third lateral, and fourth lateral surfaces $\{S_D, S_P, S_1, S_2, S_3, S_4\}$ of the third magnet to the target region in space external to the magnet system; and the net magnetic field at the target region is represented by a relationship:

$$\vec{H} = \int_S \frac{p_{sm}}{4\pi\mu_0 R^2}\hat{a}_R ds$$

wherein:

$\vec{H}$ is the magnetic field generated by a magnetic surface charge density;

$p_{sm}$ is the magnetic surface charge density for a given surface of interest;

$\hat{a}_R$ is a unit vector pointing in the direction from a surface of the first or second magnet to the target region; and for $R_{first}$, $R_{second}$ and, $R_{third}$, $R \propto f(A, B, C, E; D)$, wherein A, B, C, and E are selected to optimize the net magnetic field at the target region.

12. The method of claim 11, wherein E is within a range of about 90 mm to about 170 mm, A is within a range of about 35 mm to about 65 mm, C is within a range of about 20 mm to about 38 mm, and B is within a range of about 42 mm to about 78 mm.

13. The method of claim 11, wherein E is within a range of about 104 mm to about 156 mm, A is within a range of about 50 mm to about 60 mm, C is within a range of about 23 mm, to about 35 mm, and B is within a range of about 48, to about 72 mm.

14. The method of claim 1, wherein proximal surfaces of the first and second magnets are curviplanar and concave.

* * * * *